(12) United States Patent
Spanks et al.

(10) Patent No.: US 8,545,743 B2
(45) Date of Patent: Oct. 1, 2013

(54) METHOD OF MANUFACTURING AN ARTICLE OF FOOTWEAR WITH MULTIPLE HARDNESSES

(75) Inventors: Jeffrey C. Spanks, Portland, OR (US); Eric P. Avar, Lake Oswego, OR (US); Tom Luedecke, Portland, OR (US); Chiung Yao Lynn Chang, Taichung (TW)

(73) Assignee: NIKE, Inc., Beaverton, OR (US)

( * ) Notice: Subject to any disclaimer, the term of this patent is extended or adjusted under 35 U.S.C. 154(b) by 472 days.

(21) Appl. No.: 12/466,559

(22) Filed: May 15, 2009

(65) Prior Publication Data

US 2010/0287788 A1 Nov. 18, 2010

(51) Int. Cl.
B29C 45/14 (2006.01)
B29C 65/02 (2006.01)

(52) U.S. Cl.
USPC ........... 264/244; 264/250; 264/255; 264/246; 264/230; 264/234; 264/237; 264/248

(58) Field of Classification Search
None
See application file for complete search history.

(56) References Cited

U.S. PATENT DOCUMENTS

| | | | |
|---|---|---|---|
| 1,344,930 A | 6/1920 | Wolff | |
| 3,343,223 A | 9/1967 | Ludwig | |
| 3,596,381 A | 8/1971 | Fukuoka | |
| 3,605,292 A * | 9/1971 | Goldblatt | 36/8.1 |
| 3,671,621 A * | 6/1972 | Tatsuo Fukuoka et al. | 264/244 |
| 3,720,971 A | 3/1973 | Wyness et al. | |
| 3,975,840 A * | 8/1976 | Juzenko | 36/117.1 |
| 4,034,431 A | 7/1977 | Fukuoka | |
| 4,276,254 A * | 6/1981 | Combronde | 264/251 |
| 4,290,211 A | 9/1981 | Csengeri | |
| 4,505,660 A | 3/1985 | Seidel et al. | |
| 4,525,940 A | 7/1985 | Mochizuki | |
| 4,896,440 A | 1/1990 | Salaverria | |
| 5,177,824 A | 1/1993 | Ou | |
| 5,477,577 A | 12/1995 | Hadley | |

(Continued)

FOREIGN PATENT DOCUMENTS

| | | |
|---|---|---|
| DE | 1202976 B | 10/1965 |
| EP | 0193219 A1 | 9/1986 |

(Continued)

OTHER PUBLICATIONS

International Search report and Written Opinion issued Aug. 26, 2010 in corresponding PCT Application No. PCT/Us2010/034314.

(Continued)

Primary Examiner — Edmund H. Lee
(74) Attorney, Agent, or Firm — Banner & Witcoff, Ltd.

(57) ABSTRACT

A method of forming an article of footwear includes injecting a first material into a first cavity of a mold assembly to form a sole assembly, injecting a second material into a second cavity of the mold assembly, a first last being suspended within the second cavity, to form an upper of the article of footwear about the first last. The upper and the sole assembly are positioned in contact with one another. The upper and the sole assembly are cured and bonded together to form an article of footwear. The article of footwear is removed from the mold assembly and from the first last and allowed to expand to a first size. The article of footwear is placed on a second last having a second size that is smaller than the first size, and heated and cooled until it shrinks to the second size.

22 Claims, 6 Drawing Sheets

(56) References Cited

U.S. PATENT DOCUMENTS

| | | | |
|---|---|---|---|
| 5,647,150 | A | 7/1997 | Romanato et al. |
| 6,128,834 | A | 10/2000 | Vecchiola et al. |
| 6,689,300 | B2 | 2/2004 | Chang |
| 6,910,287 | B2 | 6/2005 | Truelsen |
| 6,993,858 | B2 | 2/2006 | Seamans |
| D517,788 | S | 3/2006 | Seamans |
| D517,789 | S | 3/2006 | Seamans |
| D517,790 | S | 3/2006 | Seamans |
| D525,419 | S | 7/2006 | Seamans |
| 7,121,020 | B1 | 10/2006 | Bathum |
| 7,146,751 | B2 | 12/2006 | Seamans |
| D535,088 | S | 1/2007 | Seamans |
| D543,341 | S | 5/2007 | Seamans |
| D543,681 | S * | 6/2007 | McCarthy .................. D2/969 |
| D547,540 | S | 7/2007 | Maderspach |
| D549,434 | S | 8/2007 | Seamans |
| D550,441 | S | 9/2007 | Seamans |
| D556,438 | S | 12/2007 | Maderspach |
| D557,006 | S | 12/2007 | Maderspach |
| 7,320,188 | B2 | 1/2008 | Bathum |
| D563,082 | S | 3/2008 | Seamans |
| D564,204 | S | 3/2008 | Seamans |
| D564,205 | S | 3/2008 | Seamans |
| D564,206 | S | 3/2008 | Seamans |
| D564,207 | S | 3/2008 | Seamans |
| D564,208 | S | 3/2008 | Seamans |
| D564,743 | S | 3/2008 | Seamans |
| D564,749 | S | 3/2008 | Seamans |
| 7,337,558 | B2 | 3/2008 | Terlizzi et al. |
| 7,347,012 | B2 | 3/2008 | Clark et al. |
| D571,548 | S | 6/2008 | Seamans |
| D575,499 | S | 8/2008 | Seamans |
| D575,942 | S | 9/2008 | del Biondi et al. |
| D575,943 | S | 9/2008 | del Biondi et al. |
| D576,387 | S | 9/2008 | del Biondi et al. |
| D576,388 | S | 9/2008 | del Biondi et al. |
| D576,389 | S | 9/2008 | del Biondi et al. |
| D576,390 | S | 9/2008 | del Biondi et al. |
| 2003/0131499 | A1 | 7/2003 | Silverman |
| 2004/0231191 | A1 * | 11/2004 | Seamans .................. 36/11.5 |
| 2004/0244221 | A1 | 12/2004 | Hall et al. |
| 2005/0060914 | A1 | 3/2005 | Fuerst |
| 2006/0048407 | A1 | 3/2006 | Seamans |
| 2007/0130797 | A1 | 6/2007 | Seamans |
| 2007/0234591 | A1 | 10/2007 | Lambert et al. |
| 2007/0289161 | A1 | 12/2007 | Gerber |
| 2008/0005856 | A1 | 1/2008 | Hung |
| 2008/0022561 | A1 | 1/2008 | Klavano |
| 2008/0083485 | A1 | 4/2008 | Chi |
| 2008/0127520 | A1 | 6/2008 | Luedecke et al. |
| 2008/0148599 | A1 | 6/2008 | Collins |
| 2008/0155855 | A1 | 7/2008 | Klavano |
| 2008/0155856 | A1 | 7/2008 | Bathum |
| 2008/0244932 | A1 | 10/2008 | Nau |
| 2008/0313929 | A1 | 12/2008 | Hoyt |
| 2009/0013555 | A1 * | 1/2009 | Vitulli .................. 36/10 |

FOREIGN PATENT DOCUMENTS

| | | | |
|---|---|---|---|
| EP | 1803364 A3 | | 7/2007 |
| FR | 2468323 A1 | | 5/1981 |
| GB | 662950 A | | 12/1951 |
| GB | 1078526 A | | 8/1967 |
| JP | 05031001 | * | 2/1993 |
| KR | 10-2006-0021328 | | 3/2006 |
| KR | 20-0417711 | | 6/2006 |

OTHER PUBLICATIONS

International Preliminary Report on Patentability issued Nov. 24, 2011 in corresponding PCT Application No. PCT/US2010/034314.

Office Action regarding U.S. Appl. No. 13/315,807 dated Apr. 5, 2012, 5 pages.

Final Office Action dated Jul. 19, 2012, issued in corresponding U.S. Appl. No. 13/315,807 (8 pages).

Eva Slipper, product information, Fuzhou Xingda Wangsheng Plastics Shoes Co., Ltd., printed Sep. 16, 2008, http://fuzhouxdws.en.alibaba.com/product/200217614/207696243/EVA_women_s_slipper... (2 pages).

Mens Benassi Slide, product information and order form, LineDrive, printed Sep. 16, 2008, http://store.linedrive.com/mens-benassi-slide.html (1 page).

Pan Star Sandal, product information, Thai Sung Shin New Materail Co., Ltd., printed Sep. 16, 2008, http://thaisungshin.com/Index.asp (1 page).

PT. Sung Shin Indonesia, company profile, Alibaba.com, printed Sep. 16, 2008, http://www.alibaba.com/company/10806813.html (2 pages).

Shusheng Company LTD., multiple product information pages, MadeInChina.com, printed Sep. 16, 2008, http://security.trade.madeinchina.com/992570/S1799857/Injection-Phylon-Sandals-Slipper... (3 pages).

Office Action, issued Mar. 26, 2013, in corresponding Korean Patent Application No. 10-2011-7029328.

* cited by examiner

METHOD OF MANUFACTURING AN ARTICLE OF FOOTWEAR WITH MULTIPLE HARDNESSES

FIELD

Aspects of this invention relate generally to an article of footwear, and, in particular, to a method of manufacturing an article of footwear having multiple hardnesses.

BACKGROUND

Conventional articles of athletic footwear include two primary elements, an upper and a sole structure. The upper provides a covering for the foot that comfortably receives and securely positions the foot with respect to the sole structure. In addition, the upper may have a configuration that protects the foot and provides ventilation, thereby cooling the foot and removing perspiration. The sole structure is secured to a lower portion of the upper and is generally positioned between the foot and the ground. In addition to attenuating ground reaction forces, the sole structure may provide traction, control foot motions (e.g., by resisting over pronation), and impart stability, for example. Accordingly, the upper and the sole structure operate cooperatively to provide a comfortable structure that is suited for a wide variety of activities, such as walking and running.

The sole structure generally incorporates multiple layers that are conventionally referred to as an insole, a midsole, and an outsole. The insole is a thin, compressible member located within the upper and adjacent to a plantar (i.e., lower) surface of the foot to enhance footwear comfort. The midsole, which is conventionally secured to the upper along the length of the upper, forms a middle layer of the sole structure and is primarily responsible for attenuating ground reaction forces. The outsole forms the ground-contacting element of footwear and is usually fashioned from a durable, wear-resistant material that includes texturing to improve traction.

The conventional midsole is primarily formed from a resilient, polymer foam material, such as polyurethane or ethyl vinyl acetate (EVA), that extends throughout the length of the footwear, often by way of an injection molding process. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

It would be desirable to provide a method of manufacturing an article of footwear that reduces or overcomes some or all of the difficulties inherent in prior known devices. Particular advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide an article of footwear having multiple hardnesses. In accordance with a first illustrative aspect, a method of forming footwear includes injecting a first material into a first cavity of a mold assembly to form a sole assembly, injecting a second material into a second cavity of the mold assembly, a first last being suspended within the second cavity, to form an upper of the article of footwear about the first last. The upper and the sole assembly are positioned in contact with one another. The upper and the sole assembly are cured and bonded together to form an article of footwear. The article of footwear is removed from the mold assembly and from the first last and allowed to expand to a first size. The article of footwear is placed on a second last having a second size that is smaller than the first size, and heated and cooled until it shrinks to the second size.

In accordance with another illustrative aspect, a method of forming an article of footwear includes the steps of injecting EVA having a first hardness into a first cavity in a first portion of a mold assembly to form a sole assembly of an article of footwear, the first portion including a first recess and a cover plate that together define the first cavity; injecting EVA having a second hardness that is less than the first hardness into a second cavity, the second cavity defined by a second recess formed in a second portion of the mold assembly, a first last suspended within the second recess and a third recess formed in an upper surface of the cover plate to form an upper of the article of footwear, the upper having a first aperture formed in an upper surface of a midfoot portion thereof and a second aperture formed in a rear surface of a heel portion thereof, the second material being flexible, resilient and stretchy and configured to allow the upper to conform snugly and tightly to a user's foot and provide tension to keep the article of footwear on the user's foot; allowing the upper and sole assembly to partially cure; removing the cover plate from the mold assembly; positioning the first and second portions of the mold assembly together such that the upper and sole assembly are in contact with one another; subjecting the mold assembly to heat and pressure such that the upper and sole assembly bond together to form an article of footwear; removing the article of footwear from the mold assembly and from the first last; allowing the article of footwear to expand to a first size; placing the article of footwear on a second last having a second size that is smaller than the first size; and heating and cooling the lasted article of footwear until it shrinks to the second size.

In accordance with a further illustrative aspect, an article of footwear includes a sole assembly formed of a first material having a first hardness. An upper is formed of a second material having a second hardness that is less than the first hardness and is a flexible, resilient and stretchy material configured to allow the upper to conform snugly and tightly to a user's foot and provide tension to keep the article of footwear on the user's foot. The upper is positioned above and bonded to the sole assembly.

Certain embodiments provide an article of footwear with a soft, flexible, resilient and stretchy upper configured to conform snugly and tightly to the user's foot. The softness, flexibility, resilience and stretchability help make the upper comfortable on the foot of the user. These and additional features and advantages disclosed here will be further understood from the following detailed disclosure of certain embodiments.

Figure 1:
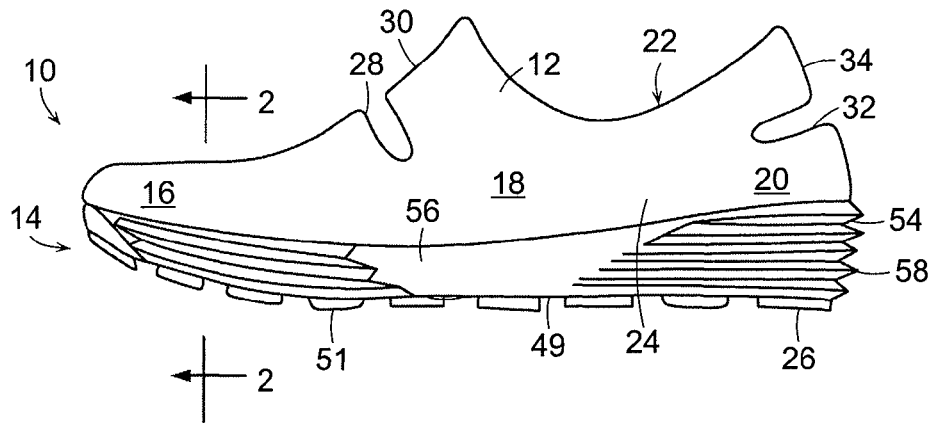
FIG. 1 is an elevation view of an article of footwear with multiple hardnesses.

The figures referred to above are not drawn necessarily to scale, should be understood to provide a representation of particular embodiments of the invention, and are merely conceptual in nature and illustrative of the principles involved. Some features of the article of footwear depicted in the drawings have been enlarged or distorted relative to others to facilitate explanation and understanding. The same reference numbers are used in the drawings for similar or identical components and features shown in various alternative embodiments. Articles of footwear as disclosed herein would have configurations and components determined, in part, by the intended application and environment in which they are used.

DETAILED DESCRIPTION OF CERTAIN PREFERRED EMBODIMENTS

The following discussion and accompanying figures disclose various embodiments of a sole structure for an article of footwear. The sole structure may be applied to a wide range of athletic footwear styles, including tennis shoes, football shoes, cross-training shoes, walking shoes, soccer shoes, and hiking boots, for example. The sole structure may also be applied to footwear styles that are generally considered to be non-athletic, including dress shoes, loafers, sandals, and work boots. An individual skilled in the relevant art will appreciate, therefore, that the concepts disclosed herein apply to a wide variety of footwear styles, in addition to the specific style discussed in the following material and depicted in the accompanying figures.

Figure 2:
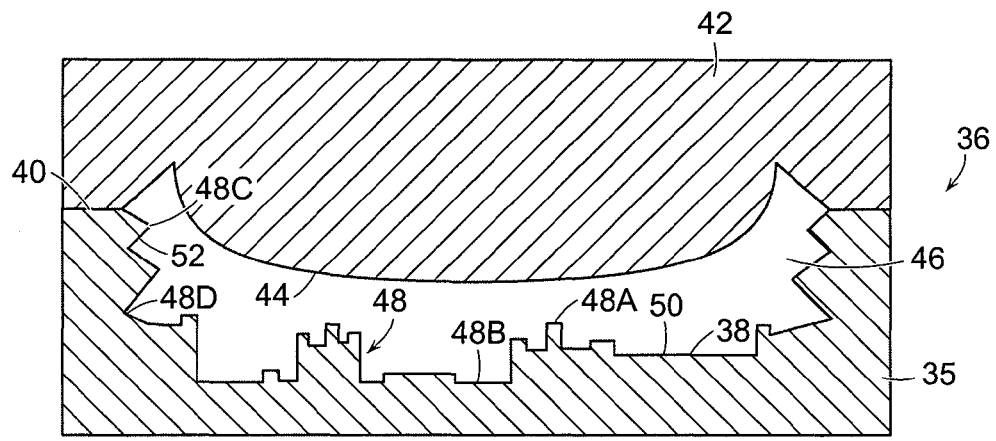
FIG. 2 is a section view, taken along line 2-2 of FIG. 1, of a mold assembly, shown with a bottom plate having a first recess, and a cover plate, and used to make a sole assembly of the article of footwear of FIG. 1.
Figure 3:
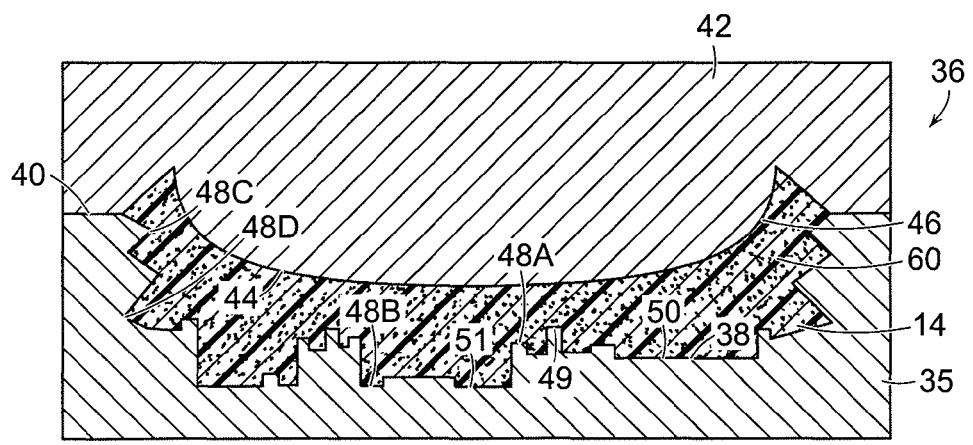
FIG. 3 is a section view of the mold assembly of FIG. 2, shown with a first material that forms the sole assembly injected into the mold assembly.

An article of footwear 10 is depicted in FIG. 1 as including an upper 12 and a sole assembly 14. For reference purposes, footwear 10 may be divided into three general portions: a forefoot portion 16, a midfoot portion 18, and a heel portion 20, as shown in FIGS. 1 and 2. Footwear 10 also includes a lateral side 22 and a medial side 24. Forefoot portion 16 generally includes portions of footwear 10 corresponding with the toes and the joints connecting the metatarsals with the phalanges. Midfoot portion 18 generally includes portions of footwear 10 corresponding with the arch area of the foot, and heel portion 20 corresponds with rear portions of the foot, including the calcaneus bone. Lateral side 22 and medial side 24 extend through each of portions 16-20 and correspond with opposite sides of footwear 10.

Portions 16-20 and sides 22-24 are not intended to demarcate precise areas of footwear 10. Rather, portions 16-20 and sides 22-24 are intended to represent general areas of footwear 10 to aid in the following discussion. In addition to footwear 10, portions 16-20 and sides 22-24 may also be applied to upper 12, sole assembly 14, and individual elements thereof.

The figures illustrate only an article of footwear intended for use on the right foot of a wearer. One skilled in the art will recognize that an article of footwear for the left foot of a wearer, such article being the mirror image of the right, is intended to fall within the scope of the present invention.

Unless otherwise stated, or otherwise clear from the context below, directional terms used herein, such as rearwardly, forwardly, inwardly, downwardly, upwardly, etc., refer to directions relative to footwear 10 itself. Footwear 10 is shown in FIG. 1 to be disposed substantially horizontally, as it would be positioned on a horizontal surface when worn by a wearer. However, it is to be appreciated that footwear 10 need not be limited to such an orientation. Thus, in the illustrated embodiment of FIG. 1, rearwardly is toward heel portion 20, that is, to the right as seen in FIG. 1. Naturally, forwardly is toward forefoot portion 16, that is, to the left as seen in FIG. 1, and downwardly is toward the bottom of the page as seen in FIG. 1. Inwardly is toward the center of footwear 10, and outwardly is toward the outer peripheral edge of footwear 10.

Upper 12 forms an interior void that comfortably receives a foot and secures the position of the foot relative to sole assembly 14. The configuration of upper 12, as depicted, is suitable for use during athletic activities that involve running, for example. Sole assembly 14, which is generally disposed between the foot of the wearer and the ground, provides attenuation of ground reaction forces (i.e., imparting cushioning), traction, and may control foot motions, such as pronation.

Sole assembly 14 is attached to upper 12 and functions as the primary shock-attenuating and energy-absorbing component of footwear 10. In the illustrated embodiment, sole assembly 14 is a single unitary piece of material, a bottom surface 26 of which provides the external traction surface for footwear 10. It is to be appreciated that, in certain embodiments, a separate outsole member, or a plurality of outsole members, may be secured to bottom surface 26 of sole assembly 14.

A first aperture 28 may be formed in an upper surface 30 of upper 12, in the upper midstep area of midfoot portion 18. In the illustrated embodiment, first aperture 28 has the form of a slot extending across the upper surface 30 of midfoot portion 18. A second aperture 32 may be formed in a rear surface 34 of heel portion 20 of upper 12. In the illustrated embodiment, second aperture 32 has the form of a slot that wraps about rear surface 34 of heel portion 20 of upper 12. First and second apertures 28, 32 serve to enhance the flexibility and stretchability of midfoot portion 18 and heel portion 20 of upper 12, thereby facilitating securing footwear 10 on the foot of a user.

A first portion or bottom plate 35 of an embodiment of a mold assembly 36 used in the manufacture of footwear 10 is shown in FIG. 2. A first recess 38 is formed in an upper surface 40 of bottom plate 35. A cover plate 42 is positioned over bottom plate 35, with a bottom surface 44 of cover plate 42 and first recess 38 defining a first cavity 46.

In certain embodiments one or more surface irregularities 48 is formed in first recess 38. Surface irregularities 48 may be formed in the bottom 50 of first recess 38 or in sidewalls 52 of first recess 38. Surface irregularities 48 may take any form. For example, projections 48A may be formed in bottom 50, serving to form mating recesses 49 (seen in FIG. 1) in the bottom of sole assembly 14 when footwear 10 is molded in mold assembly 36. Recesses 48B may also be formed in bottom 50, serving to form mating projections 51 in the bottom of sole assembly 14 when footwear 10 is molded in mold assembly. Similarly, projections 48C may be formed in sidewalls 52 of first recess 38, serving to form mating recesses 54 in the sidewalls 56 of sole assembly 15. Recesses 48D may be formed in sidewalls 52 of first recess 38, serving to form mating projections 58 in the sidewalls 55 of sole assembly 14. In the illustrated embodiment, projections 48C take the form of ribs and recesses 48 D take the form of grooves, such that recesses 54 take the form of grooves and projections 58 take the form of ribs in sidewalls 56 of sole assembly 14.

A first material 60 is injected into cavity 46 and partially cured so as to form sole assembly 14. First material 60 has a first hardness. First material has a hardness that is suitable for forming the ground-contacting element of footwear 10, and, therefore, may be durable and wear-resistant.

In certain embodiments, first material has a hardness of approximately 55 Asker C. In certain embodiments, first material 60 is injection phylon (Ethylene Vinyl Acetate or "EVA"). Other suitable materials for first last 68 will become readily apparent to those skilled in the art, given the benefit of this disclosure.

Figure 4:
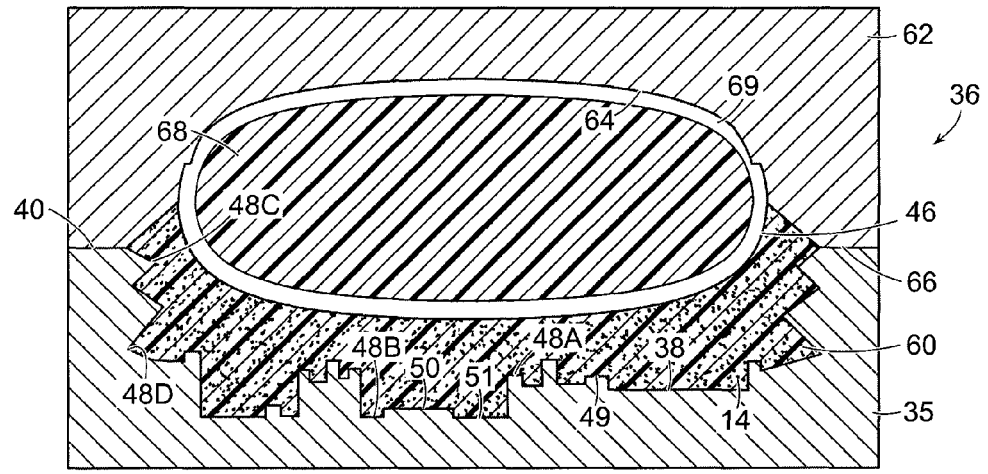
FIG. 4 is a section view of the mold assembly of FIG. 2, shown with a top plate of the mold assembly in contact with the bottom plate, and a first last suspended in a second recess formed in the top plate.
Figure 5:
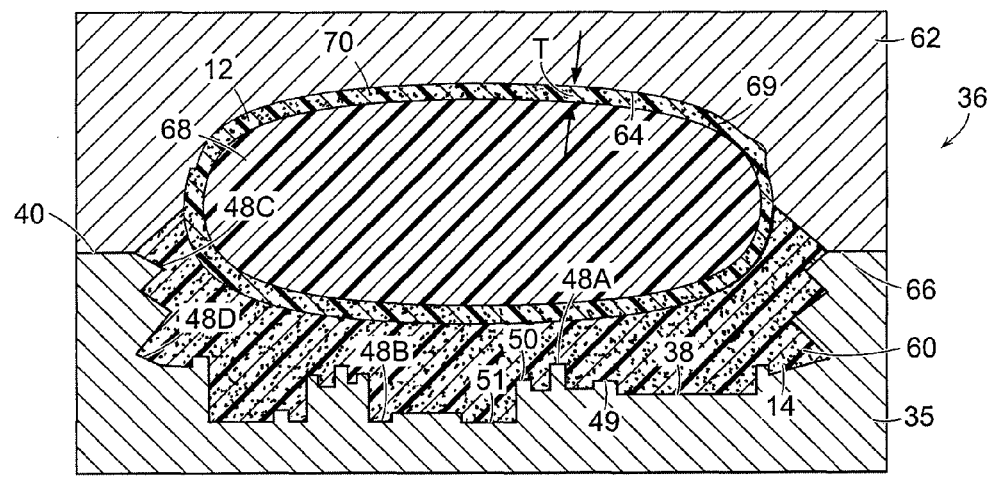
FIG. 5 is a section view of the mold assembly of FIG. 4, shown with a second material that forms an upper of the article of footwear of FIG. 1 injected into the second recess about the first last.

Cover plate 42 is then removed from bottom plate 35, and a top plate 62 is positioned in contact with bottom plate 35, as seen in FIGS. 4-5. A second recess 64 is formed in a bottom surface 66 of top plate 62 and is positioned above and exposed to first material 60. A first last 68 is suspended within second recess 64, with second recess 64 and first last 68 defining a second cavity 69. In certain embodiments, first last 68 is formed of aluminum. Other suitable materials for first last 68 will become readily apparent to those skilled in the art, given the benefit of this disclosure.

A second material 70 is injected into second cavity 69 about first last 68, the second material forming upper 12 of footwear 10. Second material 70 has a hardness that is less than that of first material 60. Second material 70 is a soft, flexible, resilient and stretchy material configured to conform snugly and tightly to the user's foot and provide tension to keep footwear 10 on the user's foot. The softness, flexibility, resilience and stretchability of second material 70 help make upper 12 comfortable on the foot of the user.

In certain embodiments, upper 12 has a thickness T that varies along its profile. Upper 12 may be thinner at its upper edge and thicker where it joins with sole assembly 14. In certain embodiments upper 12 varies from a thickness T of approximately 2 mm at its top edge to approximately 6-7 mm at its bottom edge where it joins with sole assembly 14.

In certain embodiments, the hardness of second material 70 is approximately 42 Asker C. In certain embodiments, second material 70 is injection phylon (Ethylene Vinyl Acetate or 'EVA').

After second material 70 is injected, mold assembly 36 is subject to heat and pressure for a desired time to allow first material 60 and second material 70 to cure and bond together. In certain embodiments, mold assembly 36 is heated to between approximately 160° C. and approximately 180° C. In certain embodiments, mold assembly 36 is subjected to approximately 100 kg/cm$^2$.

Figure 6:
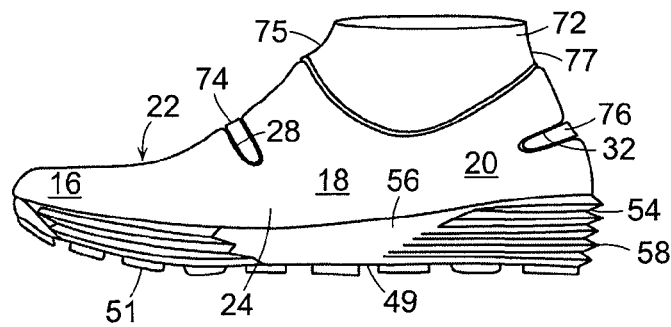
FIG. 6 is an elevation view of the article of footwear of FIG. 1 mounted on a second last after being removed from the mold assembly of FIG. 5.

Top plate 62 is then removed from bottom plate 35, footwear 10 is removed from mold assembly 36 and taken off of first last 68. Footwear 10 expands to a first size when taken out of mold assembly 36. Footwear 10 is then placed on a second last 72, as seen in FIG. 6.

A first projection 74 is formed on an upper surface 75 of second last 72 in midfoot portion 18, and is received by first aperture 28 of upper 12. A second projection 76 is formed on a rear surface of second last 72 in heel portion 20, and is received by second aperture 32 of upper 12.

In certain embodiments, second last 72 is formed of wood. Second last 72 may also be formed of TPU or other plastics. Other suitable materials for second last 72 will become readily apparent to those skilled in the art, given the benefit of this disclosure.

After footwear 10 is positioned on second last 72, it is then subjected alternately to heating and cooling steps in order to shrink footwear 10 to a desired second size. When footwear 10 is shrunk to its desired size, it is removed from second last 72, providing footwear 10 as seen in FIG. 1.

In certain embodiments, footwear 10 can be customized by providing second last 72 with a particular shape. As noted above, as footwear 10 shrinks, it conforms to the shape of second last 72. In order to provide footwear 10 with a desired shape or profile, the exterior surface of second last 72 is formed with the desired shape or profile. Thus, for example, second last 72 and consequently footwear 10 can be customized to provide a higher arch on medial side 24 of footwear 10 to reduce pronation. It is to be appreciated that second last 72 and footwear 10 can be customized to accommodate any aspects of a user's foot, thereby providing improved support and comfort for the user.

Figure 7:
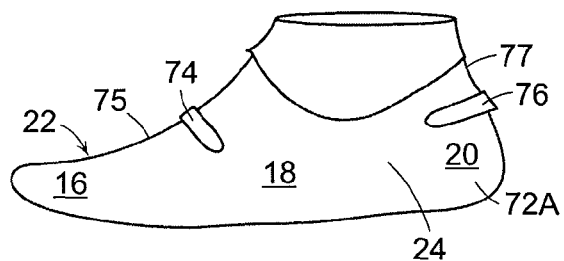
FIG. 7 is an elevation view of an alternative embodiment of a second last.
Figure 8:
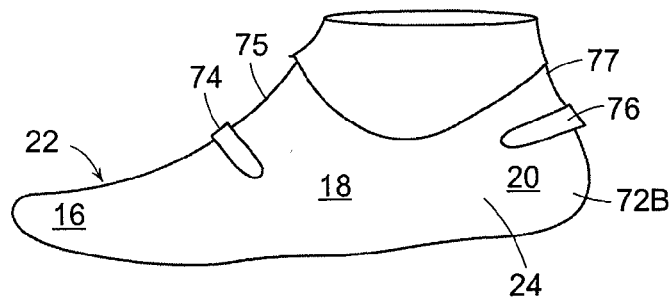
FIG. 8 is an elevation view of another alternative embodiment of a second last.
Figure 9:
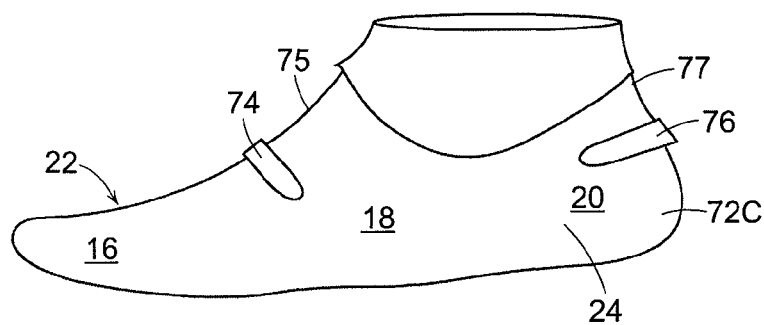
FIG. 9 is an elevation view of a further embodiment of a second last.

In certain embodiments, a plurality of second lasts 72A-C can be provided, as seen in FIGS. 7-9, with each second last 72 having a size different than the others, thereby providing a particular range of sizes for forming footwear 10. For example, second last 72A of FIG. 7 could be a size 9 last, second last 72B of FIG. 8 could be a size 9½ last, and second last 72C of FIG. 9 could be a size 10 last. When footwear 10 is removed from mold assembly 36, having a first size, which is larger than all of second lasts 72A-C, it can be placed on any of the second lasts 72A-C, and subsequently heated and cooled to shrink to the size of the selected second last 72.

Figure 10:
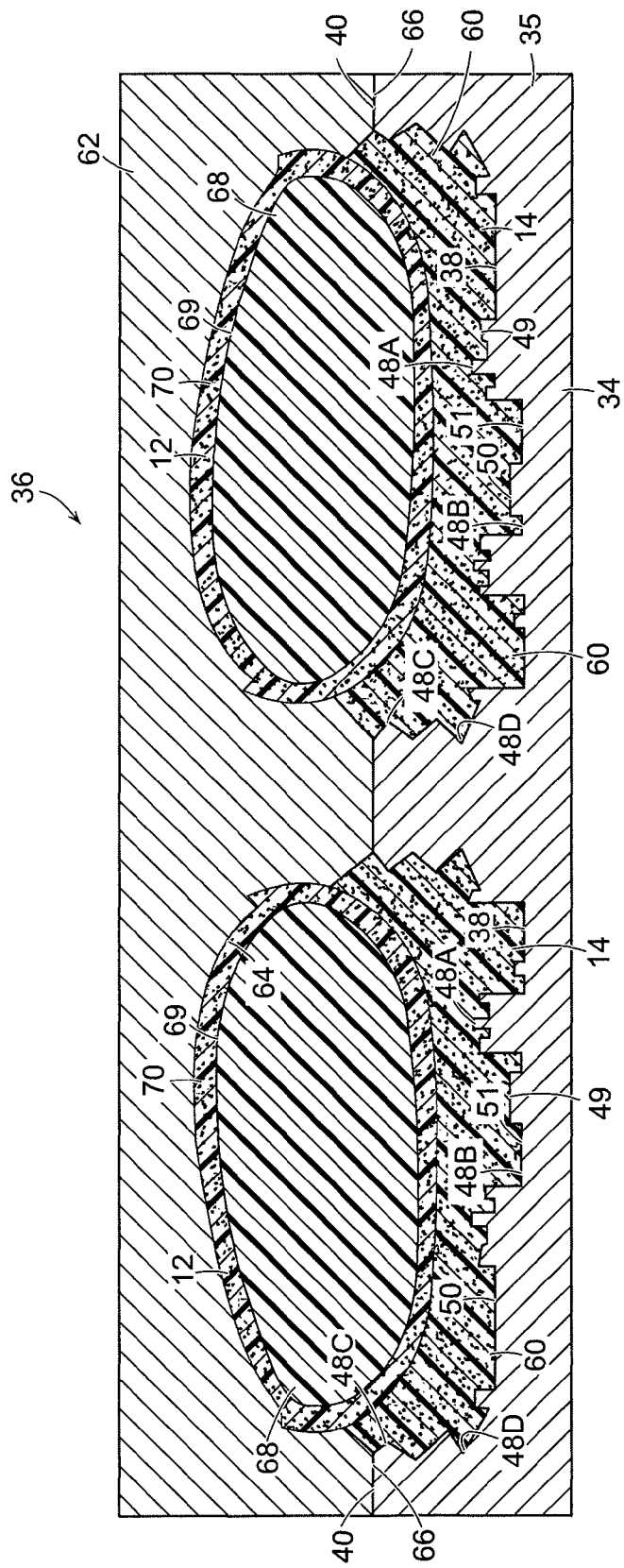
FIG. 10 is a section view of an alternative embodiment of a mold assembly, used to make a pair of the articles of footwear of FIG. 1.

In the embodiment illustrated above, mold assembly 36 is shown in use to mold a single article of footwear 10. It is to be appreciated that mold assembly 36 could be used to form multiple articles of footwear 10 simultaneously. For example, as shown in FIG. 10 a pair of articles of footwear 10 (e.g., left and right articles of a pair) could be molded in molding assembly 36. It is to be appreciated that any number of articles of footwear 10 could be molded in molding assembly 36.

Figure 11:
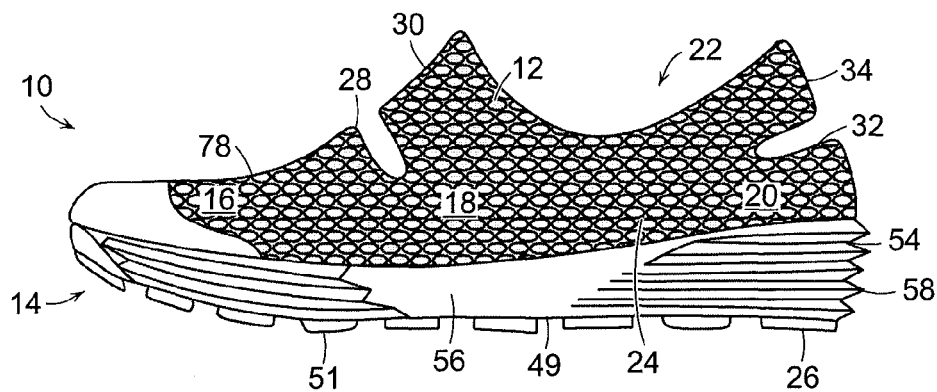
FIG. 11 is an elevation view of an alternative article of footwear with multiple hardnesses, shown with surface irregularities on its upper.
Figure 12:
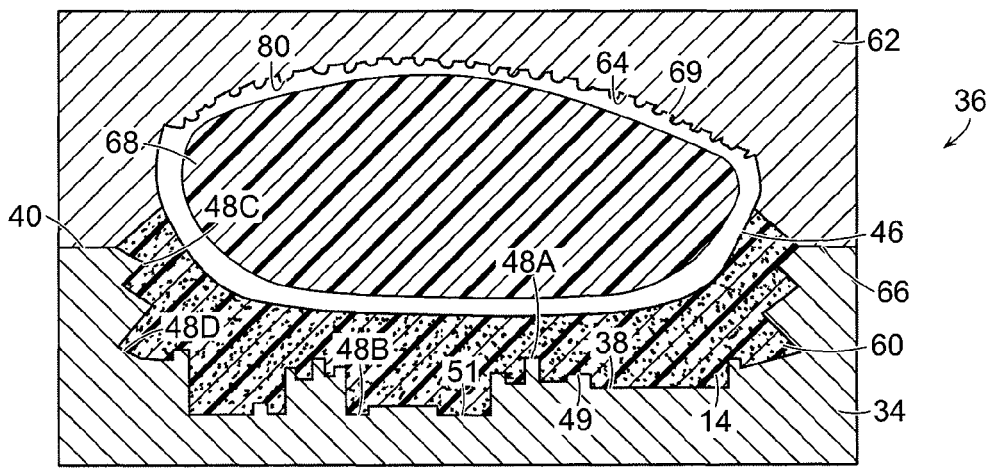
FIG. 12 is a section view of a mold assembly used to form the footwear of FIG. 11.

Another embodiment of footwear 10 is illustrated in FIG. 11, in which upper 12 has a plurality of surface irregularities 78 formed therein, providing a textured surface for upper 12. In the illustrated embodiment, surface irregularities 78 are recesses or dimples 78. In such an embodiment, corresponding surface irregularities 80 are formed in second recess 64 of top plate 62, as seen in FIG. 12. In the illustrated embodiment, where dimples 78 are formed in upper 12, the corresponding surface irregularities 80 in top plate 62 are projections or nubs 80. It is to be appreciated that surface irregularities 78 could be projections, with corresponding surface irregularities 80 taking the form of mating recesses. It is to be appreciated that some surface irregularities 78 could be projections with others being recesses, and that any number of surface irregularities can be provided on upper 12.

It is to be appreciated surface irregularities 78 can be positioned at any location on upper 12, and that surface irregularities 78 can take any form. Thus, for example, designs, logos, text, or any other element can be provided on the exterior of upper 12. In the illustrated embodiment, upper 12 is provided with a thickened portion 80 in toe portion 16, providing improved wear in toe portion 16.

In certain embodiments, first material 60 used to form sole assembly 14 is provided with a first color, while second material 70 used to form upper 12 is provided with a second color that is different than the first color, thereby allowing the aesthetics of footwear 10 to be varied.

Figure 13:
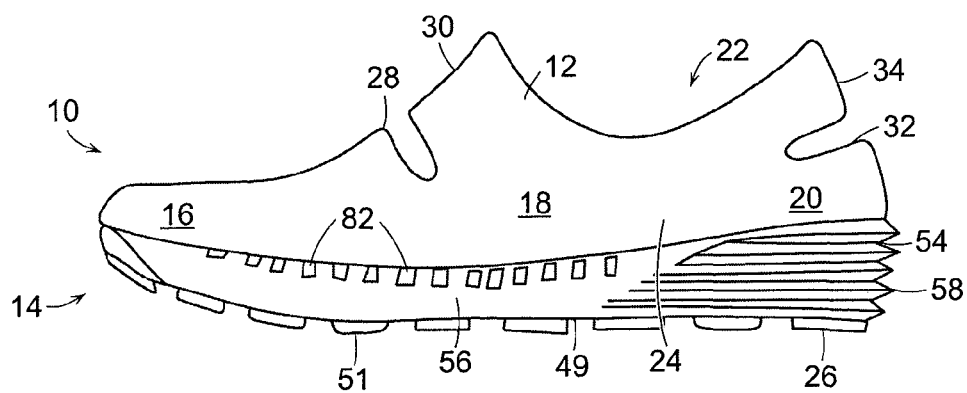
FIG. 13 is an elevation view of another alternative article of footwear with multiple hardnesses, shown with apertures formed in its sole assembly.

In certain embodiments, as illustrated in FIG. 13, a plurality of apertures 82 is formed in sole assembly 14. Apertures extend completely through sole assembly 14, providing fluid communication between the interior void in which a user's foot is received and an exterior of footwear 10. In the illustrated embodiment, apertures 82 are formed along medial side 24 and proximate an upper edge of sole assembly 14. It is to be appreciated that apertures 82 can be formed in any portion of sole assembly 14, including the bottom surface of sole assembly 14. Apertures 82 serve to allow water to pass through sole assembly 14, thereby allowing a user to walk or wade in water and have the water easily pass out of footwear 10.

Figure 14:
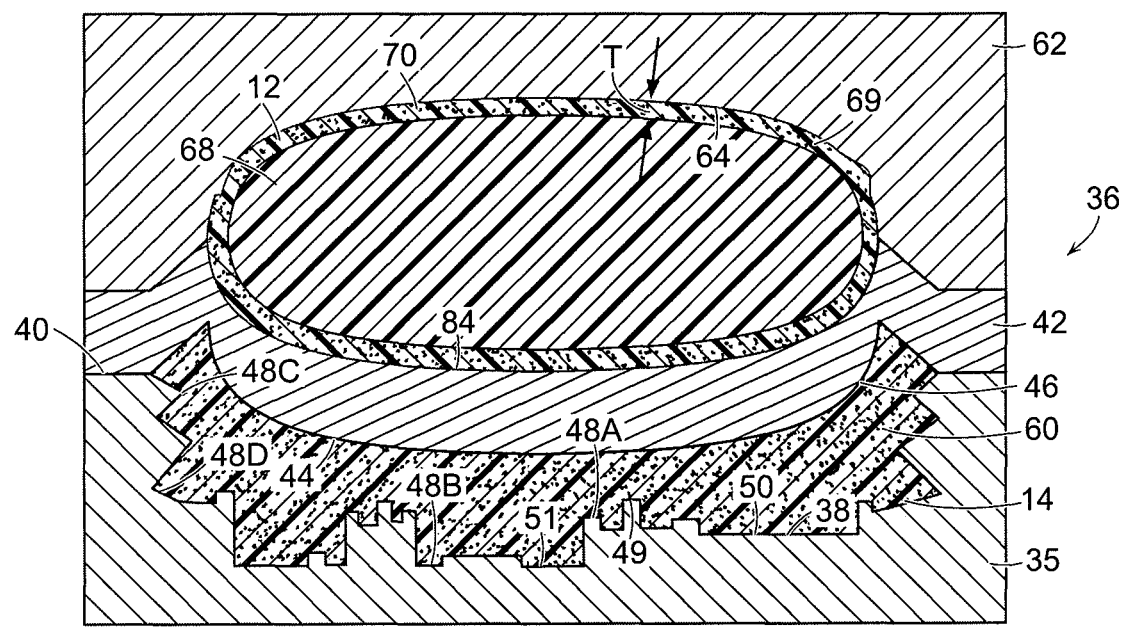
FIG. 14 is a section view of an alternative embodiment of a mold assembly used to make the article of footwear of FIG. 1.

Another embodiment of mold assembly 36 is shown in FIG. 14. In this embodiment, first material 60 and second material 70 are injected into mold assembly 36 at the same time. In this embodiment, cover plate 42 is positioned between bottom plate 35 and top plate 62. Second recess 64 in top plate 62 cooperates with a third recess 84 formed in a top surface of cover plate 42 to define second cavity 69, within which first last 68 is positioned, and into which second material 70 is injected.

After first material 60 is injected into first cavity 46 to form sole assembly 14, and second material is injected into second cavity 69 to form upper 12, sole assembly 14 and upper 12 are partially cured. Cover plate 42 is then removed, and top plate 62 is positioned directly on top of bottom plate 35 such that upper 12 and sole assembly 14 are in contact with one another, as seen in FIG. 5. Mold assembly 36 is then subjected to heat and pressure for a desired time to allow first material 60 and second material 70 to cure and bond together, as described above. The remaining steps performed to produce article of footwear 10 are the same as that described above.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of forming an article of footwear comprising the following steps:
    injecting a first material having a first hardness into a first cavity of a mold assembly to form a sole assembly of an article of footwear;
    injecting a second material having a second hardness that is less than the first hardness into a second cavity of the mold assembly, a first last being suspended within the second cavity, to form an upper of the article of footwear about the first last, the upper having a first portion configured to extend over an instep of a user—s foot and a second portion configured to extend around the user—s foot;
    allowing the upper and the sole assembly to cure and bond together to form an article of footwear;
    removing the article of footwear from the mold assembly and from the first last;
    allowing the article of footwear to expand to a first size;
    placing the article of footwear on a second last having a second size that is smaller than the first size; and
    applying heat and cooling the lasted article of footwear in alternating steps until it shrinks to the second size.

2. The method of claim 1, wherein the first material is EVA.

3. The method of claim 1, wherein the second material is EVA.

4. The method of claim 1, wherein the second material is a flexible, resilient and stretchy material configured to conform snugly and tightly to a user's foot and provide tension to keep the article of footwear on the user's foot.

5. The method of claim 1, wherein the upper has a first aperture formed in an upper surface of a midfoot portion thereof and a second aperture formed in a rear surface of a heel portion thereof.

6. The method of claim 5, wherein the first and second apertures are in the form of slots.

7. The method of claim 1, wherein the second last has a first projection formed in an upper surface of a midfoot portion thereof and a second projection formed in a rear surface of a heel portion thereof.

8. The method of claim 1, wherein the first material has a hardness of approximately 55 Asker C.

9. The method of claim 1, wherein the second material has a hardness of approximately 42 Asker C.

10. The method of claim 1, wherein the upper has a thickness between approximately 2 mm and approximately 7 mm.

11. The method of claim 1, wherein a plurality of second lasts is provided, each second last having a size different than the other second lasts, the article of footwear being placed on one of the second lasts prior to the step of heating and cooling.

12. The method of claim 1, wherein the first recess includes a plurality of surface irregularities that form mating surface irregularities in the sole assembly.

13. The method of claim 1, wherein the second recess includes a plurality of surface irregularities that form mating surface irregularities in the upper.

14. The method of claim 1, wherein the first material has a first color and the second material has a second color that is different than the first color.

15. The method of claim 1, wherein a plurality of apertures is formed in the sole assembly.

16. The method of claim 1, wherein the first cavity is defined by a first recess in an upper surface of a first portion of the mold assembly, and a cover plate.

17. The method of claim 16, further comprising the step of removing the cover plate from the mold assembly after injecting the first material into the first cavity and the second material into the second cavity.

18. The method of claim 17, wherein the upper and the sole assembly are positioned in contact with one another after the cover plate is removed from the mold assembly.

19. The method of claim 16, wherein a second recess is formed in a lower surface of a second portion of the mold assembly, the first last being suspended within the second recess, the second cavity being defined by the second recess, the first last, and the sole assembly.

20. The method of claim 16, wherein a second recess is formed in a lower surface of a second portion of the mold assembly, the first last being suspended within the second recess, the second cavity being defined by the second recess, the first last, and a third recess formed in an upper surface of the cover plate.

21. A method of forming an article of footwear comprising the following steps:
injecting EVA having a first hardness into a first cavity in a first portion of a mold assembly to form a sole assembly of an article of footwear, the first portion including a first recess and a cover plate that together define the first cavity;
injecting EVA having a second hardness that is less than the first hardness into a second cavity, the second cavity defined by a second recess formed in a second portion of the mold assembly, a first last suspended within the second recess and a third recess formed in an upper surface of the cover plate to form an upper of the article of footwear, the upper having a first aperture formed in an upper surface of a midfoot portion thereof and a second aperture formed in a rear surface of a heel portion thereof, the second material being flexible, resilient and stretchy and configured to allow the upper to conform snugly and tightly to a user's foot and provide tension to keep the article of footwear on the user's foot;
allowing the upper and sole assembly to partially cure;
removing the cover plate from the mold assembly;
positioning the first and second portions of the mold assembly together such that the upper and sole assembly are in contact with one another;
subjecting the mold assembly to heat and pressure such that the upper and sole assembly bond together to form an article of footwear;
removing the article of footwear from the mold assembly and from the first last;
allowing the article of footwear to expand to a first size;
placing the article of footwear on a second last having a second size that is smaller than the first size; and
heating and cooling the lasted article of footwear until it shrinks to the second size.

22. The method of claim 1, wherein the upper and sole are positioned in contact with one another before they are allowed to cure and bond together.

* * * * *